(12) United States Patent
Shewchuk et al.

(10) Patent No.: US 7,249,373 B2
(45) Date of Patent: Jul. 24, 2007

(54) UNIFORMLY REPRESENTING AND TRANSFERRING SECURITY ASSERTION AND SECURITY RESPONSE INFORMATION

(75) Inventors: John P. Shewchuk, Redmond, WA (US); Giovanni M. Della-Libera, Seattle, WA (US); Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/342,774

(22) Filed: Jan. 15, 2003

(65) Prior Publication Data

US 2004/0139352 A1 Jul. 15, 2004

(51) Int. Cl.
*G06K 9/00* (2006.01)
*H04L 9/32* (2006.01)
*G06F 7/04* (2006.01)
*G06F 15/16* (2006.01)

(52) U.S. Cl. ............................ 726/5; 726/2; 709/230; 709/232

(58) Field of Classification Search ................ 726/2–3, 726/9–14; 715/513; 709/230, 237, 225, 709/229, 232, 246
See application file for complete search history.

(56) References Cited

U.S. PATENT DOCUMENTS 5,542,046 A * 7/1996 Carlson et al. ................ 726/5
6,850,979 B1 * 2/2005 Saulpaugh et al. .......... 709/225
6,928,545 B1 * 8/2005 Litai et al. ................... 713/185
6,954,792 B2 * 10/2005 Kang et al. .................. 709/229
7,072,984 B1 * 7/2006 Polonsky et al. ........... 709/246

OTHER PUBLICATIONS

Snell et al, Programming Web Services with SOAP, Jan. 2002, O'Reilly & Associates, Inc.. First Edition, pp. 11, 13-15, 22-23 and 25-26.*

* cited by examiner

*Primary Examiner*—Emmanuel L. Moise
*Assistant Examiner*—Minh Dieu Nguyen
(74) *Attorney, Agent, or Firm*—Workman Nydegger (57) ABSTRACT

A requesting message processor identifies client security input data of a first format and encapsulates the client security input data within a client security token. A requesting token processing interface sends the client security token to a validating message processor. A validating token processing interface at the validating message processor receives the client security token. Based on the encapsulated client security input data, the validating message processor selects client security output data of a second format. The validating message processor encapsulates the security output data within a response security token. The validating token processing interface sends the response security token to the requesting message processor. The token processing interfaces can be configured to similarly abstract security input data and security output data so as to increase the possibility of compatible communication between the requesting and validating message processor.

21 Claims, 6 Drawing Sheets

UNIFORMLY REPRESENTING AND TRANSFERRING SECURITY ASSERTION AND SECURITY RESPONSE INFORMATION

BACKGROUND OF THE INVENTION

1. The Field of the Invention

The present invention relates to computer network security, and more specifically, to mechanisms for uniformly representing and transferring security assertion and security response information.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

Often, electronic communication on a computer network includes a client computer system (hereinafter referred to as a "client") requesting access to a network service (e.g., electronic mail or a web page) at a server computer system (hereinafter referred to as a "server"). Frequently, network services are protected by security mechanisms such that only trusted clients are allowed to access the network services. Thus, when requesting access to a network service, a client may submit security input that includes or represents security assertions (e.g., a user-id, a password, a digital signature, etc.). The server can process the submitted security input and output a security response. When the client's security input is appropriate (e.g., when the client is authenticated and authorized), the server may output a security response that indicates access to the network service has been granted. On the other hand, when the client's security input is not appropriate, the server may output a security response that indicates access to the network service has been denied.

Security input can be submitted in any of a number of different data formats. Likewise, security responses can be output in any of a number of different data formats. In some environments, a client may request issuance of a service access token from a token issuance service. In these environments, a client submits security input in the form of a request that includes security assertions. If the security assertions included in the request are appropriate, the token issuance service can respond with security output in the form of a service access token. The client can then use the issued service access token as proof of trust to a server.

In other environments, a client may request exchange of a first service access token (that may represent one or more security assertions) from a token exchange service. In these other environments, a client submits security input in the form of the first service access token. If the first service access token is appropriate, the token exchange service can respond with security output in the form of a second service access token. The client can then use the second service access token (potentially along with one or more other tokens) as proof of trust to a server.

In yet other environments, a client may request validation of particular security assertions from a validation service. In these yet other environments, a client submits security input in the form of one or more security assertions. If the one or more security assertions are valid, the validation service can respond with security output in the form of an answer indicating that the one or more security assertions are valid (e.g., by signing the security assertions). The client can then use the answer as proof of trust to a server.

Unfortunately, a client and a server may not support the same formats for security input and/or for security output. This can lead to incompatibilities that prevent even a trusted client from being able to provide proof of trust to a server. For example, a client that only supports token issuance (and is thus configured to submit security input in the form of a request including security assertions) may have limited, if any, mechanisms for submitting security input to a token exchange service that only supports token exchange (and is thus configured to receive security input in the form of a service access token). Compatible communication may be even more difficult on networks (e.g., the Internet) where a client and a service are managed by different entities. For example, a user of the client may have limited, if any, ability to configure the service to receive security input in the form of a request that includes security assertions. Similarly, an administrator of the service may have limited, if any, ability to configure the client to submit security input in the form of a service access token.

In some network environments, a client and server (as well as any token issuance services, token exchange services, and validation services) may each use different specialized protocols to transfer security input and security output. For example, a client may be configured to send service access tokens using a Security Assertion Markup Language ("SAML") protocol. However, a token exchange service may be configured to receive service access tokens using an XML Key Management Specification ("XKMS") protocol. Thus, even through both the client and the token exchange service support service access tokens, the client may be prevented from submitting a service access token for exchange.

To potentially alleviate incompatibilities resulting from the use of different specialized protocols, computer systems on a network may maintain a protocol stack for each different type of specialized protocol. For example, a server may maintain both a SAML protocol stack for communicating with a client and an XKMS protocol stack for communicating with a validation service. However, maintenance of multiple protocol stacks consumes system resources (e.g., system memory) that would otherwise be available for use by other processes. Further, these specialized protocols typically differ from more generalized protocols used to transfer application data. However, for compatibility reasons, a computer system may be constrained to using a specialized protocol to transfer security input and security output.

In some environments, a server receives security input via a first protocol stack and then transfers the security input via a second different protocol stack to a validation service (or a token exchange service or issuance service). For example, a server that receives security input via a SAML protocol stack may transfer the security input via a XKMS protocol stack to a validation service. While waiting for security output via XKMS from the validation service, the server may be required to maintain state information (thereby consuming additional system resources) for the SAML protocol stack. Failure to maintain the SAML state information can result in the server being unable to appropriately send security output back to the client.

Therefore systems, methods, computer program products, and data structures for uniformly representing and transferring security assertion and security response information would be advantageous.

BRIEF SUMMARY OF THE INVENTION

The foregoing problems with the prior state of the art are overcome by the principles of the present invention, which are directed towards methods, systems, computer program products, and data structures for uniformly representing and transferring security assertion and security response information. A requesting message processor identifies that client security input data of a first format (e.g., one or more security assertions, a request including one or more security assertions, or a service access token representing one or more security assertions, etc.) is to be transferred to a validating message processor. For example, the requesting message processor may identify one or more security assertions from a client message processor that are to be transferred to the validating message processor to request issuance of a service access token.

The requesting message processor encapsulates the client security input data within a client security token such that the client security input data can be compatibly processed at the validating message processor. Encapsulating the client security input data within a client security token abstracts the client security input data so client security input data of different formats can be more uniformly represented. A requesting token processing interface sends the client security token (as well as possibly also sending other non-encapsulated security input data, such as, for example, a digital signature) to the validating message processor. The requesting token processing interface abstracts protocols potentially used to transfer security input data and security output data so as to significantly reduce, and possibly eliminate, the need to maintain a number of different specialized protocol stacks. Thus, a common protocol can be used for all token acquisitions.

A corresponding validating token processing interface at the validating message processor receives the client security token from the requesting message processor. The validating token processing interface can abstract specialized protocols similar to the requesting token processing interface so as to increase the possibility of compatible communication between the requesting message processor and the validating message processor. Based on the client security input data encapsulated in the client security token (and possibly other non-encapsulated security input data), the validating message processor selects client security output data (e.g., a service access token, an answer, a Boolean statement, a trust statement, etc.) of a second format. The second format can differ from, be similar to, or even be the same as the first format.

The validating message processor encapsulates the client security output data within a response security token such that the client security output data can be compatibly processed at the requesting message processor. Encapsulating the client security output data within a response security token abstracts the client security output data so client security output data of different formats can be more uniformly represented. The validating token processing interface sends the response security token to the requesting message processor. The requesting token interface receives the response security token. The requesting message processor processes the client security output data encapsulated in the response security token to determine if the client message processor is a trusted client.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for uniformly representing and transferring security assertions and security responses. A requesting message processor identifies client security input data (from a client message processor) of a first format. The requesting message processor encapsulates the security input data within a client security token so as to provide a more uniform representation of security input data of different formats (e.g., one or more security assertions, a request including one or more security assertions, a service access token representing one or more security assertions, etc.). A requesting token processing interface sends the client security token (as well as possibly also sending other non-encapsulated security input data, such as, for example, a digital signature) to a validating message processor. The requesting token processing interface abstracts protocols potentially used to transfer security input data and security output data to reduce the need for a plurality of specialized protocol stacks.

A corresponding validating token processing interface at the validating message processor receives the client security token (and possibly other non-encapsulated security input data). The validating token processing interface can abstract specialized protocols similar to the requesting token processing interface to increase the possibility of compatible communication between the requesting message processor and the validating message processor. Based on the encapsulated client security input data and any non-encapsulated security input data, the validating message processor selects client security output data of a second format. The validating message processor encapsulates the security output data in a response security token so as to provide a more uniform representation of security output data of different formats (e.g., service access tokens, answers, Boolean statements, trust statements, etc.).

The validating token processing interface sends the response security token to the requesting message processor. The requesting token interface receives the response security token. The requesting message processor processes the response security token to determine if the client message processor is a trusted client.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. Computer-readable media that store computer-executable instructions are physical storage media. Computer-readable media that carry computer-executable instructions are transmission media.

Thus, by way of example, and not limitation, such computer-readable media can comprise physical storage media or transmission media. Physical storage media can include RAM, ROM, EPROM, CD-ROM or other optical disk storage, magnetic disk storage or other magnetic storage devices, or any other media which can be used to store desired program code means in the form of computer-executable instructions, computer-readable instructions, or data structures and which may be accessed by a general-purpose or special-purpose computer system.

In this description and in the following claims, a "network" is defined as any architecture where two or more computer systems can exchange data with each other. When information is transferred or provided over a network or another communications connection (either hardwired, wireless, or a combination of hardwired or wireless) to a computer system, the connection is properly viewed as a transmission medium. Combinations of the above should also be included within the scope of computer-readable media. Computer-executable instructions comprise, for example, instructions and data which cause a general-purpose computer system or special-purpose computer system to perform a certain function or group of functions. The computer-executable instruction may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that may enable the transport of electronic data, such as, for example, electronic messages, between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of virtual networks, such as, for example, Virtual Local Area Networks ("VLANs") or Virtual Private Networks ("VPN").

In this description and in the following claims, a "message processor" is defined as one or more modules (hardware and/or software) that operate together to perform messaging operations on electronic messages. Messaging operations may include, for example, initiating a message, accessing a message, appending information to a message, sending a message, receiving a message, routing a message, removing information from a message, and terminating a message. Any message processor can include the functionality to perform one or more of these messaging operations. It may be that the modules of a message processor are included within a general-purpose computer system, such as, for example, within a laptop or desktop computer system. On the other hand, it may also be that the modules of a message processor exist as a standalone special-purpose computer system.

In this description and the following claims, "security assertions" are defined generally to include any data used to prove the identity of a message processor. Security assertions can include, for example, user-identifiers, passwords, and digital signatures. In this description and the following claims, "security responses" are defined generally to include any data used to indicate to a message processor whether or not submitted proof (e.g., security assertions) is appropriate (e.g., has submitted proof resulted in the message processor being viewed as a trusted message processor). Security assertions and security responses can be represented using virtually any data types including, numeric data types (e.g., 12, D4, 11001, etc.), characters data types (e.g., "c", "v", "6", etc.), strings data types (e.g., "Sig=DF56K890", etc.), or user-defined data types.

In this description and in the following claims, "security input data" is defined generally to represent security assertions of different formats, such as, for example, one or more security assertions, requests including one or more security assertions, and service access tokens representing one or more security assertions.

In this description and in the following claims, "security output data" is defined generally to represent security responses of different formats, for example, answers including an indication of whether or not one or more security assertions are valid, service access tokens representing one or more security assertions, Boolean statements, and trust statements.

In this description and in the following claims, a "validating message processor" is defined generally to include any message processor that can receive security input data, can determine if the security input data is valid, and can send security output data indicating whether or not the security input data is valid. A validating message processor is defined to include a message processor that can issue service access tokens, exchange service access tokens, and validate security assertions.

In this description an in the following claims, a "requesting message processor" is defined generally to include any message processor that can submit security input data for validation and can receive security output data indicating whether or not the security input data is valid.

In this description and in the following claims, "routing" is defined to include sending, receiving, and/or determining where to send an electronic message. For example, a sending message processor may initiate an electronic message and include routing information within the electronic message (e.g., in a routing field of the electronic message) that indicates the electronic message is to be routed to a receiving message processor. An intermediary message processor that accesses the electronic message can determine, based on the included routing information, where to route the electronic message.

If appropriate, the intermediary message processor can route the electronic message directly to the receiving message processor. However, it may be that the intermediary message processor is not directly connected to the receiving message processor (or for some other reason can not directly communicate with the receiving message processor). Thus, it may be appropriate for the intermediary message processor to route the electronic message to a second intermediary message processor that is included in a routing path between the sending and receiving message processors. Based on information within an electronic message, the intermediary message processor can also modify routing information (e.g., by changing values in a routing field of an electronic message) included in an electronic message. It may be that a routing field is included along with other fields as part of a data structure associated with an electronic message.

In this description and in the following claims, a "schema" is defined as an expression of a shared vocabulary between a plurality of computer systems and/or a plurality of message processors that allows the plurality of computer systems and/or the plurality of message processors to process documents according to the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system or message processor that can access an XML schema can process XML documents in accordance with the XML schema. In this definition and the following claims, "schema-based" refers to being defined by and/or within a schema.

In this description and the following claims, a "digital signature" refers to a digital code used authenticate a portion of data and/or to identify an entity (e.g., computer system, message processor, or application) that signed a portion of data. A digital signature can be inserted into an electronic message to authenticate security input data and/or security output data and to identify an entity that signed the security input data and/or security output data.

Those skilled in the art will appreciate that the invention may be practiced in network computing environments with many types of computer system configurations, including routers, gateways, firewalls, proxies, personal computers, laptop computers, handheld devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Figure 1:
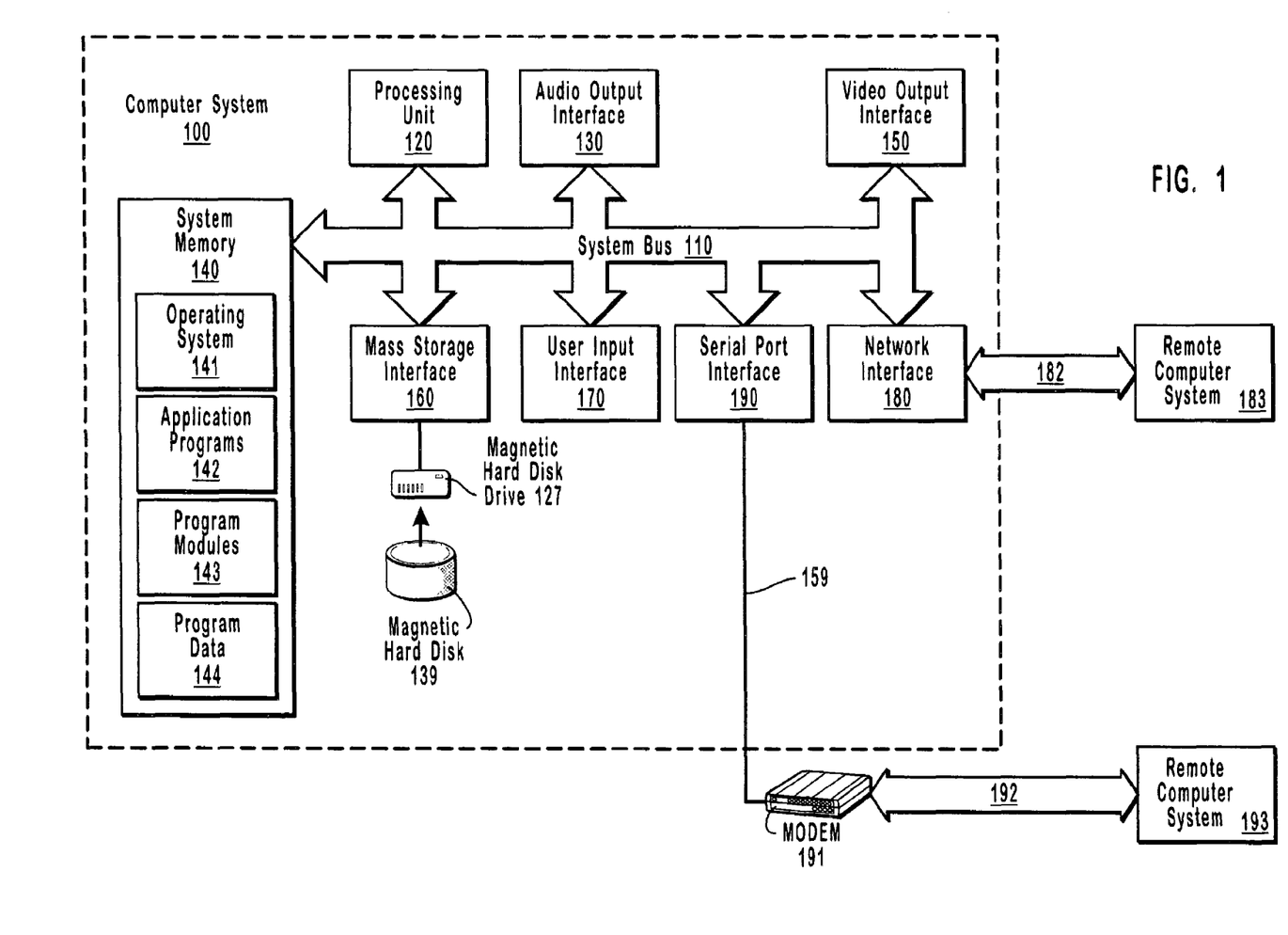
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide non-volatile storage of computer-executable instructions, data structures, program modules, and other data for computer system 100. For example, magnetic hard disk 139 can store one or more program modules including operating system 141, application programs 142, other program modules 143, and program data 144.

Computer system 100 can be network connectable to networks, such as, for example, an office-wide or enterprise-wide computer network, an intranet and/or the Internet. Computer system 100 can exchange data with external sources, such as, for example, remote message processors and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 can be a client message processor, a server message processor, or a validating message processor.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 can be a client message processor, a server message processor, or a validating message processor.

Alternatively, computer system 100 can exchange data with external sources through other interfaces, such as, for example, a parallel port, a game port, or a universal serial bus ("USB") port. It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules, token processing interfaces, and security data processing modules as well as associated data, including electronic messages, security tokens, security input data, security output data, security assertions, security responses, Boolean statements, trust statements, and service access tokens can be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored in the mass storage device.

In a networked environment, program modules and associated data, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
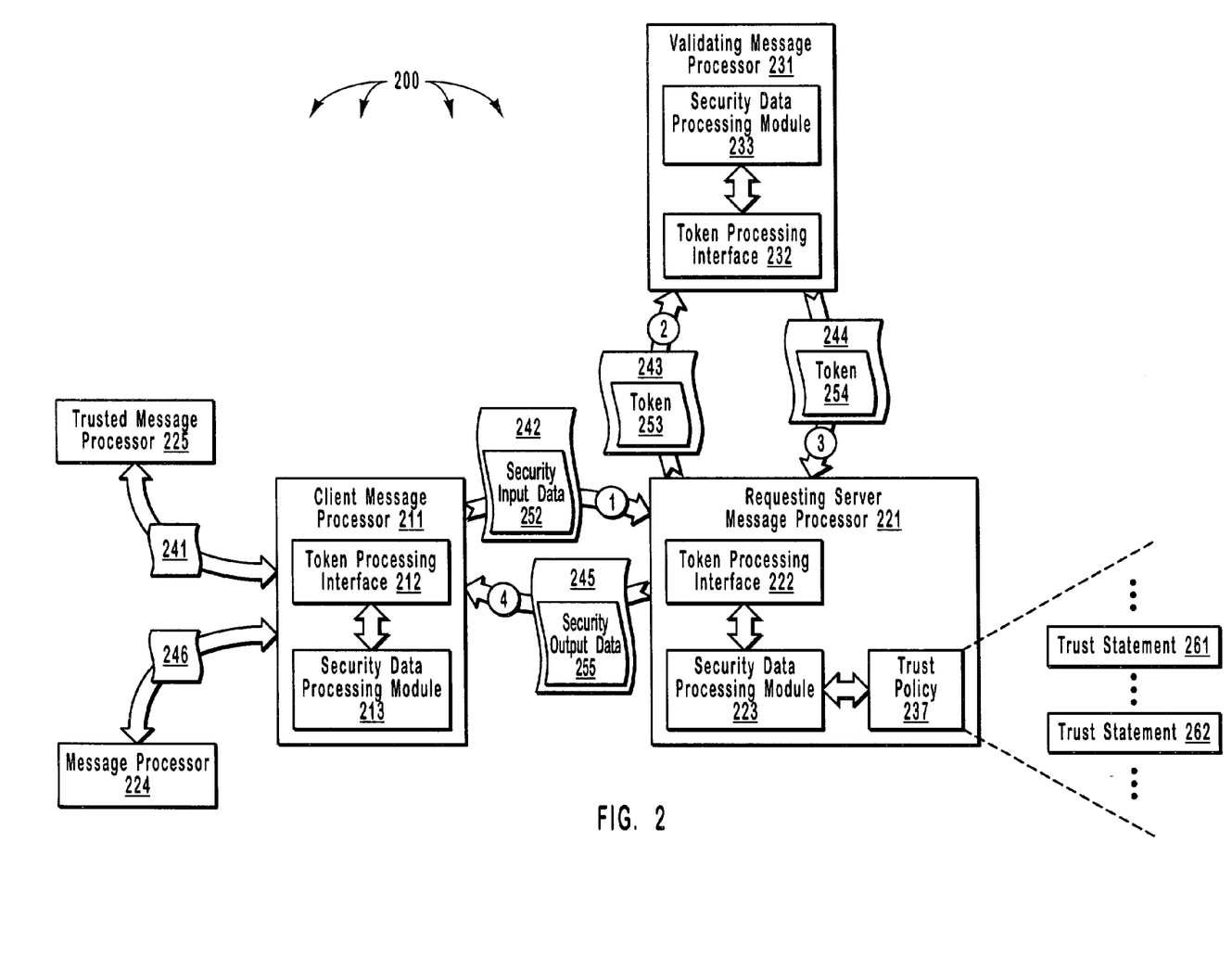
FIG. 2 illustrates an example of a network architecture that can facilitate uniformly representing and transferring security input data and security output data.

FIG. 2 illustrates an example of network architecture 200 that can facilitate uniformly representing and transferring security assertions and security responses. Depicted in network architecture 200 are client message processor 211, requesting server message processor 221, and validation message processor 231. The message processors depicted in network architecture 200 can communicate by transferring electronic messages (e.g., electronic messages 241 through 246) via logical communication links (not shown) that interconnect the depicted message processors. Message processors depicted in network architecture 200 can initiate electronic messages and route electronic messages to (or through) other message processors within network architecture 200 or other message processes external to network architecture 200 (not shown). For example, client message processor 211 can initiate electronic message 242 that is routed through one or more external message processors and then received at requesting server message processor 221.

Electronic messages 241 and 246 illustrate generally that client message processor 211 can communicate with trusted message processor 225 and message processor 224 respectively. Trusted message processor 225 may be a message processor that is trusted by requesting server message processor 221. A trust statement (e.g., trust statement 261) in trust policy 237 can indicate that trusted message processor 225 is trusted by requesting server message processor 221. Trust statements in trust policy 237 can also indicate how requesting message processor 221 trusts trusted message processor 225. For example, requesting server message processor 221 may trust trusted message processor 225 to perform authentication, to execute applications stored at requesting message processor 225, etc. In some embodiments, levels of trust are utilized to represent how one message processor (e.g., requesting server message processor 221) trusts another message processor (e.g., client message processor 211).

Message processor 224 may be a message processor that is unknown to requesting server message processor 221. Client message processor 211 may send client security input data to trusted message processor 225 or message processor 224. Trusted message processor 225 or message processor 224 may receive the client security input data and may append a digital signature to the client security input data. Trusted message processor 225 or message processor 224 can then return the digitally signed client security input data to client message processor 211.

Figure 4:
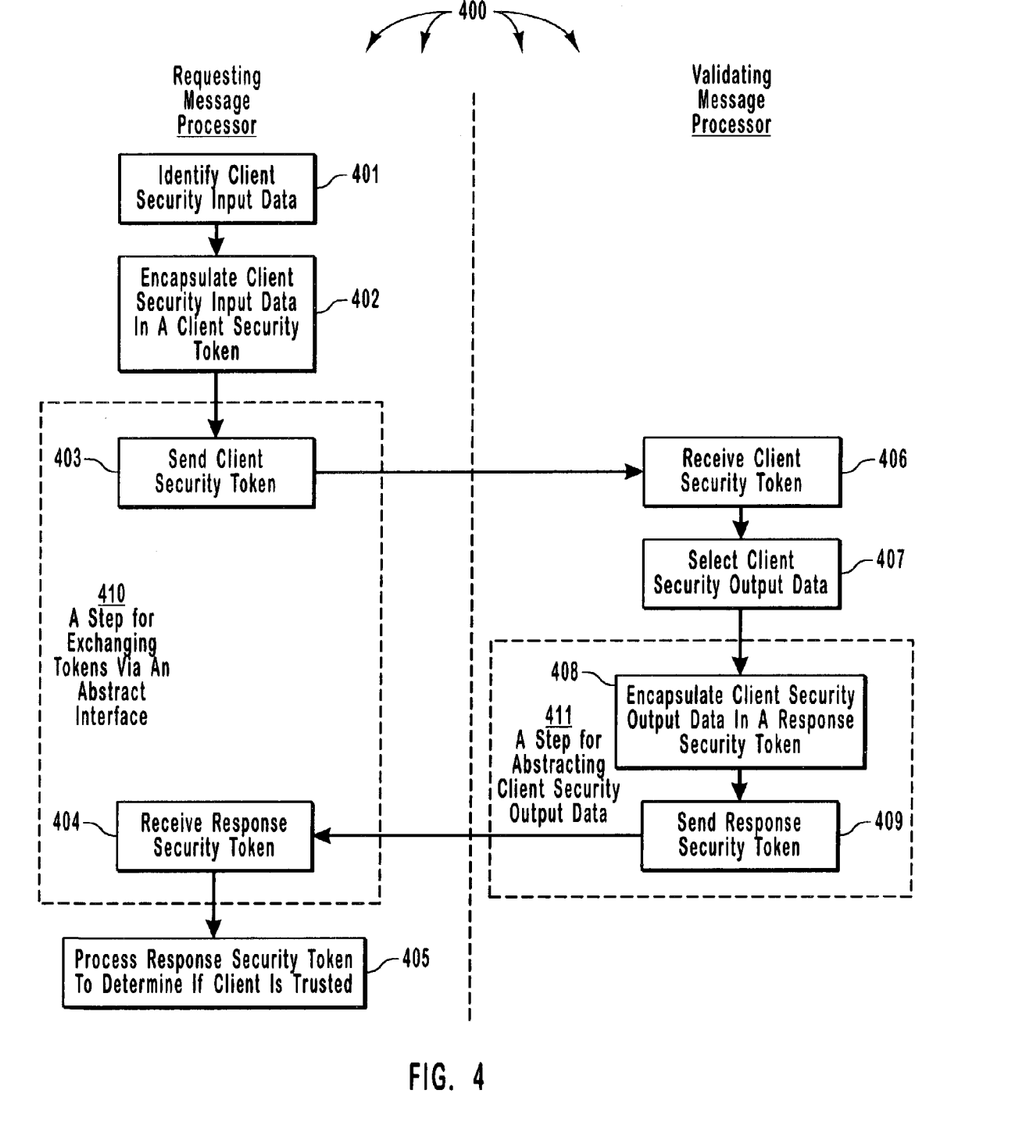
FIG. 4 illustrates a flowchart of a method for uniformly representing and transferring security assertions and security responses.

FIG. 4 illustrates a flowchart of a method 400 for uniformly representing and transferring security input data and security output data. The method 400 will be described with respect to the message processors depicted in network architecture 200.

Method 400 includes an act of identifying client security input data (act 401). Act 401 can include a requesting message processor identifying client security input data of at least a first format that is to be transferred to a validating message processor. Client security input data of different formats can be identified. For example, a first format may be one or more security assertions, a second format may be a request that includes one or more security assertions, a third format may be a service access token that represents one or more security assertions, etc. Identified client security input data in one or more of the different formats can be transferred to the validating message processor.

In some embodiments, a server message processor, such as, for example, requesting server message processor 221, is viewed as a requesting message processor. In these embodiments, the server message processor can identify client security input data that was received from another message processor. For example, as illustrated by arrow 1 in FIG. 2, requesting server message processor 221 receives electronic message 242, which includes security input data 252, from client message processor 211. In some embodiments, a portion of security input data 252 is encapsulated in a client security token. For example, a client security token can encapsulate a request that includes one or more security assertions or can encapsulate a service access token that represents one or more security tokens. Thus, it may be that one or more security assertions are encapsulated within a service access token and then further encapsulated within a client security token (or even a response security token). It may be that token processing interface 212 includes the client security token within message 242 so as to abstract other protocols potentially used to transfer security input data. Security data processing module 213 can identify client security input data for client message processor 211.

Message 242 can be received at requesting server message processor 221. Token processing interface 222 may abstract security input data similarly to token processing interface 212 so as to increase the possibility of compatible communication between client message processor 211 and requesting server message processor 221. Token processing interface 222 can process any client security tokens included in message 242 so as to reveal encapsulated client security input data. From the revealed client security input data, security data processing module 223 can identify client security input data that is to be transferred to validating message processor 231.

It may also be that upon receiving an electronic message that includes a client security token, requesting server message processor 221 by default forwards the electronic message to validating message processor 231. Client security input data that is not encapsulated within a client security token can also be identified at security data processing module 223. Identification of non-encapsulated client security input data may be based on existing contexts (e.g., prior agreements as to how trust relationships are established) between client message processor 211 and requesting server message processor 221.

The method 400 includes an act of encapsulating client security input data in a client security token (act 402). Act 402 can include the requesting message processor encapsulating at least a portion of identified client security input data within a client security token. For example, token processing interface 222 can encapsulate client security input data for client message processor 211 (or some other client message processor represented by security input data 252) within a client security token. Encapsulating client security input data within a client security token abstracts the security input data so security input data of different formats (e.g., security assertions, requests including security assertions, or service access tokens) can be more uniformly represented.

Encapsulating client security input data within a client security token can include transferring an existing security token. For example, requesting server message processor 221 may transfer any security tokens included in security input data 252 to validating message processor 231 (e.g., as security token 253) without causing client security input data to be revealed and/or altered. Encapsulating client security input data within a client security token can also include encapsulating a portion of client security input data 252 that was not previously encapsulated. For example, security input data 252 can be processed at requesting server message processor 221 (e.g., by token processing interface 222 and/or security data processing module 223) to encapsulate one or more portions of security input data 252 within security token 253.

When a portion of client security input data (e.g., security input data 252) is trusted by a trusted message processor (e.g., trusted message processor 225), requesting server message processor 221 may also trust the portion of client security input data without further validation. Thus, trusted portions of client security input data may not be encapsulated for further transfer to a validating message processor. On the other hand, when a portion of client security input data is not signed by a trusted message processor, requesting server message processor 221 may not trust the portion of client security input data without further validation. Thus, non-trusted portions of client security input data may be encapsulated (e.g., by token processing interface 222 and/or security data processing module 223) within a client security token (e.g., security token 253) for transfer to a validation message processor.

The method 400 includes a functional result-oriented step for exchanging tokens via an abstract interface (step 410). Step 410 may include any corresponding acts for accomplishing the result of exchanging tokens via an abstract interface. However, in the illustrated example of FIG. 4, the step 410 includes a corresponding act of sending the client security token (act 403). Act 403 can include token processing interface 222 encapsulating client security input data (e.g., a portion of security input data 252) within security token 253 and then subsequently including security token 253 within an electronic message. For example, as illustrated by arrow 2 in FIG. 2, requesting server message processor 221 sends electronic message 243, which includes security token 253 (and possibly other non-encapsulated security input data), to validating message processor 231. Token processing interface 222 can abstract specialized protocols potentially used to transfer security input data and security output data so as to significantly reduce, and possibly eliminate, the need for a plurality of different specialized protocol stacks. Thus, a common protocol can be used for all token acquisitions.

It should be understood that the present invention is not limited to messaging using any specific transport protocol and format. However, one example protocol that may be used to implement the principles of the present invention is SOAP. Electronic message 243 (as well as electronic message 242) may be a SOAP message that uses any number of lower level protocols, such as, for example, HyperText Transfer Protocol ("HTTP") or Direct Internet Message Encapsulation ("DIME") as a transport. The following represents a first example SOAP envelope that can be used to transfer a client security token:

```
1.    <Envelope>
2.      <Header>
3.        <ClientSecurityToken>
4.          CLIENT SECURITY INPUT DATA
5.        </ClientSecurityToken>
6.      </Header>
7.      <Body>
8.        APPLICATION DATA
9.      </Body>
10.   </Envelope>
```

The elements within the first example SOAP envelope (between <Envelope> and </Envelope> tags) can include one more free-form XML documents. Likewise, the elements within the first example SOAP envelope can include one more XML documents that are defined in accordance with an XML schema accessible to the message processors depicted in network architecture 200. In the first example SOAP envelope, a client security token (lines 3-5) is included in the header portion (between the <Header> and </Header> tags) and Application Data is included in the body portion (between the <Body> and </Body> tags).

The client security token can represent one or more security assertions associated with the Application Data. When security assertions are included along with associated Application Data in a message, the need to maintain state information for the Application Data can be significantly reduced, if not altogether eliminated. That is, there is a reduced need for a requesting message processor (e.g., requesting server message processor 221) to maintain the Application Data (thereby consuming system resources) while waiting for an indication if the message processor associated with the Application Data (e.g., client message processor 211) is a trusted client. Although included within the header portion of the first example SOAP envelope, a client security token may also be included in the body portion of an electronic message.

The Client Security Input Data at line 4 can be security input data of virtually any format, such as, for example, one or more security assertions, a request including one or more security assertions, or a service access token representing one or more security assertions. Although encapsulated within a client security token in the header of the first example SOAP envelope, Client Security Input Data may also be encapsulated within a client security token in the body portion of a SOAP envelope (or any other electronic message). Further, the body and/or header portion of an electronic message can also include non-encapsulated Client Security Input Data.

The Application Data at line 8 can include data being transferred between different portions of a distributed application, such as, for example, data being transferred between a first portion of a distributed application at a Web browser and a second portion of the distributed application at a Web server.

The method 400 includes an act of receiving the client security token (act 406). Act 406 can include a validating message processor receiving the client security token from the requesting message processor. For example, as illustrated by arrow 2 in FIG. 2, validating message processor 231 receives message 243, which includes security token 253 (and possibly other non-encapsulated security input data), from requesting server message processor 221. Token processing interface 232 can process security token 253 to reveal encapsulated security input data. Token processing interface 232 can be configured to abstract specialized protocols similar to token processing interface 222. This increases the possibility of compatible communication between requesting server message processor 221 and validating message processor 231.

The method 400 includes an act of selecting client security output data (act 407). Act 407 can include, based on the client security input data, selecting client security output data (e.g., a Boolean statement, a trust statement, or a service access token) of a second format. For example, when functioning as a token issuance service validating message processor 231 may receive a request with one or more security assertions (client security input data of a first format) and select a service access token (client security output data of a second format). Thus, the first and second formats can be different formats. On the other hand, when functioning as a token exchange service validating message processor 231 may receive a first service access token (client security input data of a first format) and select a second service access token (client security output data of a second format). Thus, the first and second formats can be similar formats or even the same format. Client security input data and client security output data can represent similar, dissimilar, or overlapping security assertions.

Validating message processor 231 may select client security output data by comparing client security input data to credentials in a credentials database. For example, token processing interface 232 may process security token 253 to reveal encapsulated client security input data (e.g., a portion of security input data 252). Security data processing module 233 may then compare the revealed client security input data to credentials, such as, for example, a user database or a digital signature database. When a comparison results in an appropriate match (e.g., when a user-name and password correspond to an entry in a user database), validating message processor 231 can select client security output data to indicate that client security input data is to be trusted. On the other hand, when a comparison does not result in an appropriate match (e.g., a digital signature is expired), validating message processor 231 can select client security output data to indicate that client security input data is not to be trusted.

The method 400 includes a functional result-oriented step for abstracting client security output data (step 411). Step 411 may include any corresponding acts for accomplishing the result of abstracting client security output data. However, in the illustrated example of FIG. 4, the step 411 includes a corresponding act of encapsulating client security output data in a response security token (act 408). Act 408 can include the validating message processor encapsulating client security output data within a response security token. For example, token processing interface 232 can encapsulate security output data within security token 254. Encapsulating the security output data within a response security token abstracts the security output data so security output data of different formats (e.g., service access tokens, answers indicating whether or not security assertions are valid, Boolean statements, trust statements, etc.,) can be more uniformly represented. In some embodiments, a plurality of response security tokens are used to abstract different portions of security output data. It may also be that non-encapsulated security output data is included along with one or more response security tokens in an electronic message.

Step 411 also includes a corresponding act of sending the response security token (act 409). Act 409 can include the validating message processor sending the response security token to the requesting message processor. For example, as illustrated by arrow 3 in FIG. 2, validating message processor 231 sends electronic message 244, which includes security token 254 (and possibly other non-encapsulated security output data), to requesting server message processor 221. Electronic message 244 (as well as electronic message 245) may be a SOAP message that uses any number of lower level protocols, such as, for example, HyperText Transfer Protocol ("HTTP") or Direct Internet Message Encapsulation ("DIME") as a transport. The following represents a second example SOAP envelope that can be used to transfer a response security token:

| | |
|---|---|
| 1. | <Envelope> |
| 2. | <Header> |
| 3. | <ResponseSecurityToken> |
| 4. | CLIENT SECURITY OUTPUT DATA |
| 5. | </ResponseSecurityToken> |
| 6. | </Header> |
| 7. | <Body> |
| 8. | APPLICATION DATA |
| 9. | </Body> |
| 10. | </Envelope> |

The elements within the second example SOAP envelope (between <Envelope> and </Envelope> tags) can include one more free-form XML documents. Likewise, the elements within the second example SOAP envelope can include one more XML documents that are defined in accordance with an XML schema accessible to the message processors depicted in network architecture 200. In the second example SOAP envelope, a response security token (lines 3-5) is included in the header portion (between the <Header> and </Header> tags) and Application Data is included in the body portion (between the <Body> and </Body> tags).

The response security token can be processed to indicate whether or not the associated Application Data is from a trusted message processor. When a response security token is included along with associated Application Data in a message, the need to maintain state information for the Application Data can be significantly reduced, if not altogether eliminated. That is, there is a reduced need for a requesting message processor (e.g., requesting server message processor 221) to maintain the Application Data (thereby consuming system resources) while waiting for an indication if the message processor associated with the Application Data (e.g., client message processor 211) is a trusted client. Although included within the header portion of the second example SOAP envelope, a response security token may also be included in the body portion of an electronic message.

The Client Security Output Data at line 4 can include a security response of virtually any format, such as, for example, a service access token representing one or more security assertions, an answer indicating if one or more security assertions are valid, a Boolean statement, or a trust statement. A Boolean statement can indicate a "YES" or "NO" decision as to whether Application Data is from a trusted message processor. A trust statement can indicate that a trust policy (e.g., trust policy 237) is to be updated. Validating message processor 231 may append a digital signature to security output data to indicate that Application Data is from a trusted message processor. Although encapsulated within a response security token in the header of the second example SOAP envelope, Client Security Output Data may also be encapsulated within a response security token in the body portion of a SOAP envelope (or any other electronic message). Further, the body and/or header portion of an electronic message can also include non-encapsulated Client Security Output Data.

The Application Data at line 8 can include data being transferred between different portions of a distributed application, such as, for example, data being transferred between a first portion of a distributed banking application at a user computer system and a second portion of the distributed banking application at a bank financial server.

Step 410 also includes a corresponding act of receiving the response security token (act 404). Act 404 can include the requesting message processor receiving the response security token from the validating message processor. For example, as illustrated by arrow 3 in FIG. 2, requesting server message processor 221 receives electronic message 244, which includes security token 254 (and possibly other non-encapsulated security output data) from validating message processor 231.

The method 400 includes an act of processing the response security token to determine if the client is a trusted client (act 405). Act 405 can include processing the response security token to reveal the encapsulated client security output data. For example, token processing interface 222 can process security token 254 to reveal encapsulated client security output data. Client security output data can indicate to a requesting message processor (e.g., requesting server message processor 221) if application data was received from a trusted client (e.g., client message processor 211).

When security token 254 (or other non-encapsulated security output data) includes a trust statement, requesting server message processor 221 may update trust policy 237. For example, if client security input data was digitally signed by message processor 224, validating message processor 231 may send a trust statement to requesting server message processor 221 indicating that message processor 224 is a trusted message processor. Requesting server message processor 221 can update trust policy 237 (e.g., by adding trust statement 262) to indicate that message processor 224 is a trusted message processor.

If appropriate, requesting server message processor 221 can return security output data to client message processor 211 to indicate to client message processor 211 whether or not client security input data was trusted. For example, as illustrated by arrow 4 in FIG. 2, requesting server message processor 221 sends electronic message 245, which includes security output data 255, to client message processor 211. Client message processor 211 receives electronic message 245. If portions of security output data 255 include any security tokens, token processing interface 212 can receive and process the security tokens to reveal an indication that security input data (e.g., security input data 252) was trusted or reveal an indication that security input data was not trusted.

Figure 3:
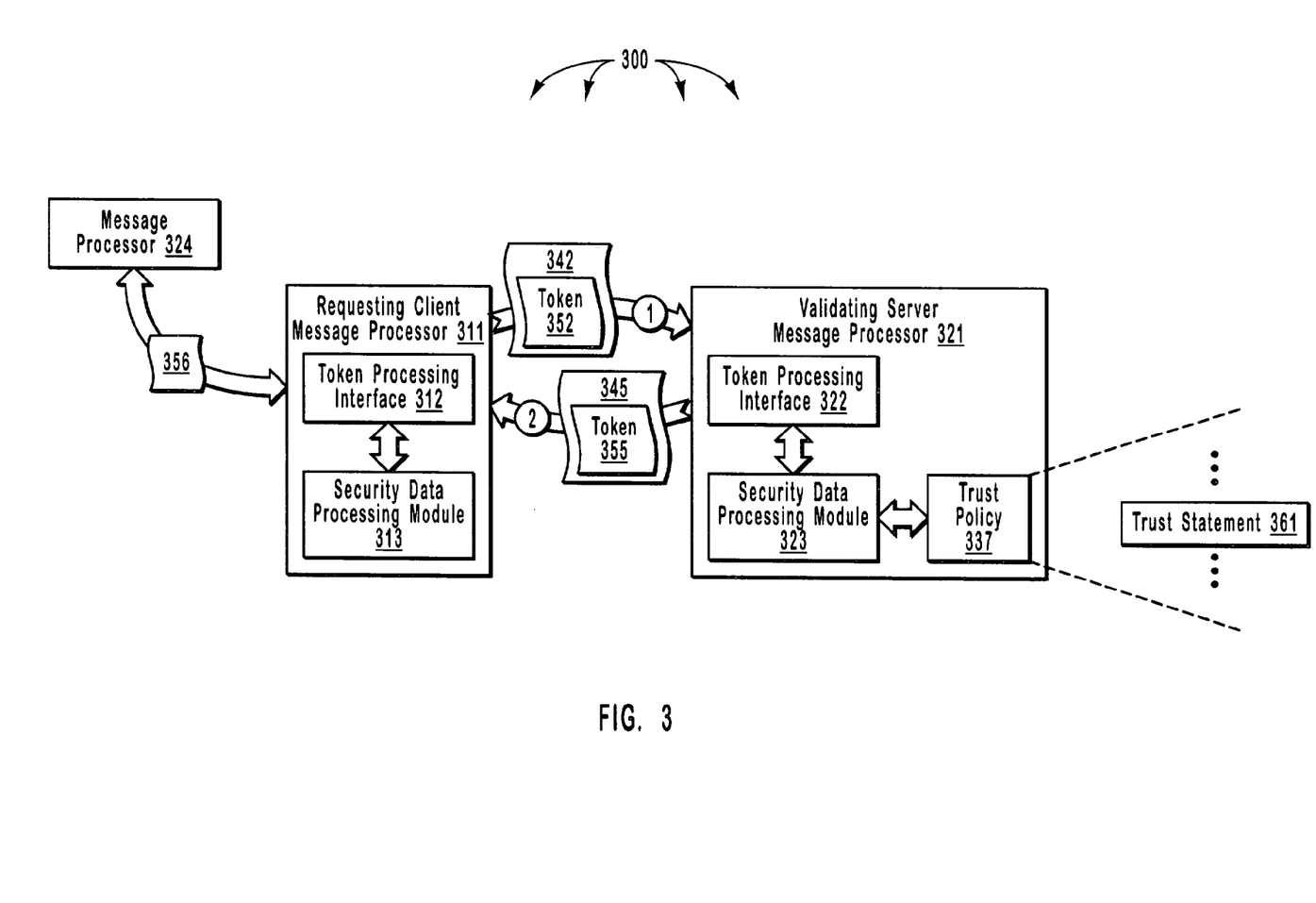
FIG. 3 illustrates a first example of a network architecture that can facilitate uniformly representing and transferring security assertions and security responses.

In some embodiments, a client message processor is a requesting message processor and a server message processor is a validating message processor. FIG. 3, illustrates network architecture 300 that includes requesting client message processor 311 and validating server message processor 321. Message 356 illustrates generally that requesting client message processor 311 can communicate with message processor 324. Requesting client message processor 311 can send client security input data to message processor 324. Message processor 324 can receive the client security input data and can append additional security assertions (e.g., a digital signature) to the client security input data. Message processor 324 can then return any original and appended security input data to requesting client message processor 311.

Security data processing module 313 can identify a subset of client security input data from within the original and appended security input data for requesting client message processor 311. Token processing interface 312 can encapsulate identified security input data within a client security token (e.g., client security token 352). As illustrated by arrow 1 in FIG. 3, requesting client message processor 311, sends electronic message 342, which includes client security token 352 (and potentially other non-encapsulated security input data), to validating server message processor 321. Token processing interface 322 can receive client security token 352. Token processing interfaces 312 and 322 can be configured to similarly abstract specialized protocols such that the possibility of compatible communication between requesting client message processor 311 and validating server message processor 321 is increased.

Token processing interface 322 can process client security token 352 to reveal encapsulated client security input data. Security data processing module 323 can compare the revealed client security input data to a credentials database, a certificate, or to trust policy 337 to determine if requesting client message processor 311 is a trusted client. A trust statement in policy 337 (e.g., trust statement 361) may indicate that requesting client message processor 311 is a trusted client. If message processor 324 digitally signed client security input data, validating server message processor 321 may determine if message processor 324 is a trusted message processor. When message processor 324 is trusted, validating server message processor 321 may trust the signed client security input data even if validating server message processor 321 does not necessarily trust requesting client message processor 311.

Based on security input data (encapsulated and/or non-encapsulated), security data processing module 323 can select client security output data. Security data processing module 323 can append selected security output data to previously received security input data. Validating server message processor 321 can also encapsulate security output data (possibly along with previously received security input data) within a response security token (e.g., response security token 355). As illustrated by arrow 2 in FIG. 3, validating server message processor 321, sends electronic message 345, which includes response security token 355 (and potentially other non-encapsulated security output data), to requesting client message processor 311. Token processing interface 312 can receive response security token and process response security token 355 (as well as any non-encapsulated security output data) to determine if requesting client message processor 311 is trusted by validating server message processor 321.

Figure 5:
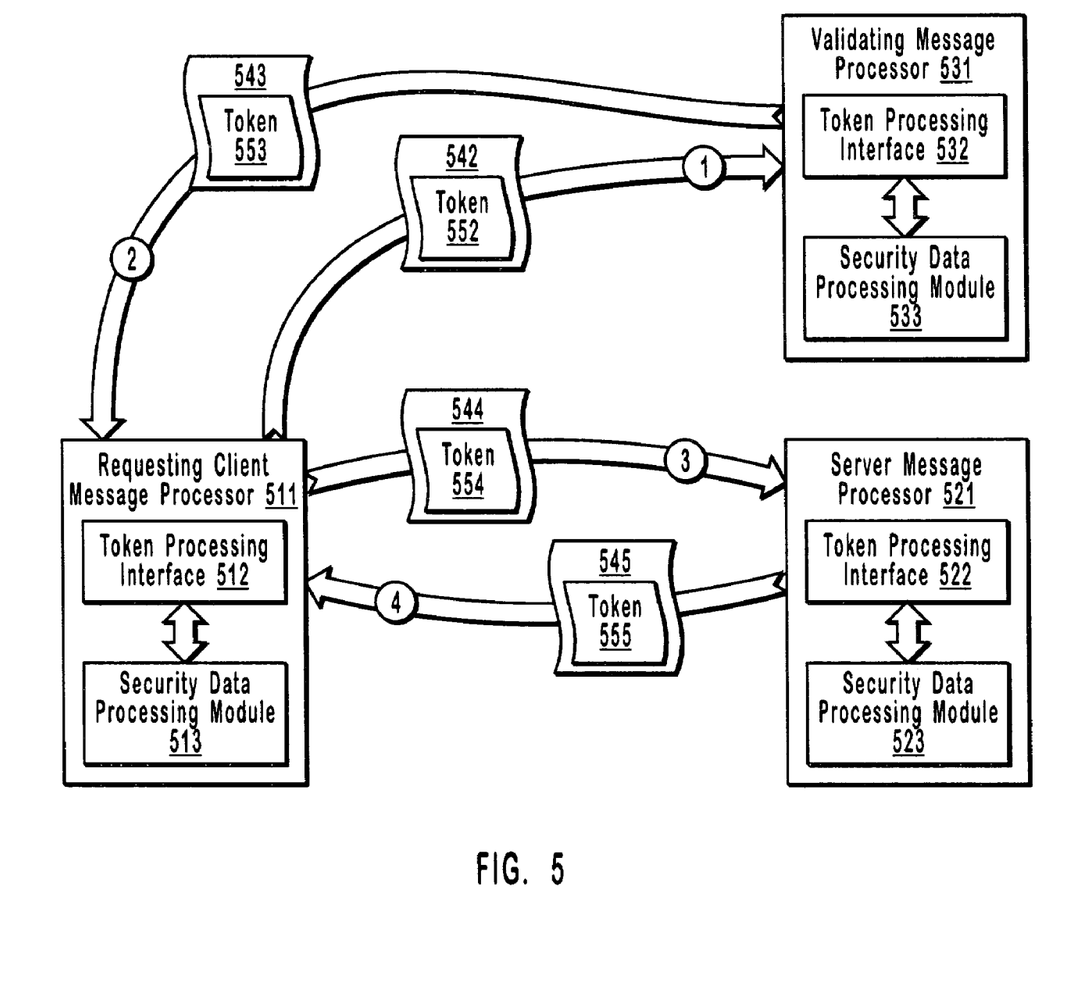
FIG. 5 illustrates a second example of a network architecture that can facilitate uniformly representing and transferring security assertions and security responses.

In some other embodiments, a requesting client message processor sends security input data to a validating message processor. FIG. 5 illustrates network architecture 500 that includes requesting client message processor 511, server message processor 521, and validating message processor 531. Security data processing module 513 can identify client security input data for requesting client message processor 511 (which is then potentially digitally signed by some other message processor). Token processing interface 512 can encapsulate identified client security input data within a client security token (e.g., client security token 552).

As illustrated by arrow 1 in FIG. 5, requesting client message processor 511 sends electronic message 542, which includes client security token 552 (and possibly other non-encapsulated security input data), to validating server message processor 531. Token processing interface 532 can receive client security token 552. Token processing interfaces 512 and 532 can be configured to similarly abstract specialized protocols such that the possibility of compatible communication between requesting client message processor 511 and validating server message processor 531 is increased.

Token processing interface 532 can process client security token 552 to reveal encapsulated client security input data. Based on the client security input data, security data processing module 533 can select client security output data and can append selected client security output data to revealed client security input data. Security data processing module 533 can compare the client security input data to a credentials database, a certificate, or to a trust policy to determine if requesting client message processor 511 is a trusted client. Token processing interface 532 can encapsulate client security output data within a response security token (e.g., response security token 553). As illustrated by arrow 2 in FIG. 5, validating message processor 531 sends electronic message 543, which includes response security token 553 (and possibly other non-encapsulated client security output data), to requesting client message processor 511. Token processing interface 512 can receive and process response security token 553.

As illustrated by arrow 3 in FIG. 5, requesting client message processor 511 sends electronic message 544, which includes response security token 554 (and possibly other non-encapsulated client security input data), to server message processor 521. Token processing interface 522 can receive response security token 554. Response security token 554 can contain some or all of the client security output data and/or client security input data encapsulated in response to security token 553. If appropriate, token processing interface 512 and/or security data processing module 513 can insert or remove client security output data and/or client security input data from response security token 553 before sending electronic message 544.

Token processing interfaces 512 and 522 can be configured to similarly abstract specialized protocols such that the possibility of compatible communication between requesting client message processor 511 and server message processor 521 is increased. As validating message processor 531 may have already validated the client security input data (as indicated by selected client security output data), server message processor 521 may trust requesting client message processor 511. Security data processing module 523 may verify that a digital signature of validating message processor 531 was not altered during transmission.

Server message processor 521 can return a security token (or other non-encapsulated security input data or security output data) to client message processor 511 indicating that requesting client message processor 511 was trusted. For example, as illustrated by arrow 4 in FIG. 5, server message processor 521 sends electronic message 545, which includes security token 555, to requesting client message processor 511. Token processing interface 512 can receive security token 555 and process security token 555 to reveal an indication that requesting client message processor 511 was trusted (or not trusted).

Figure 6:
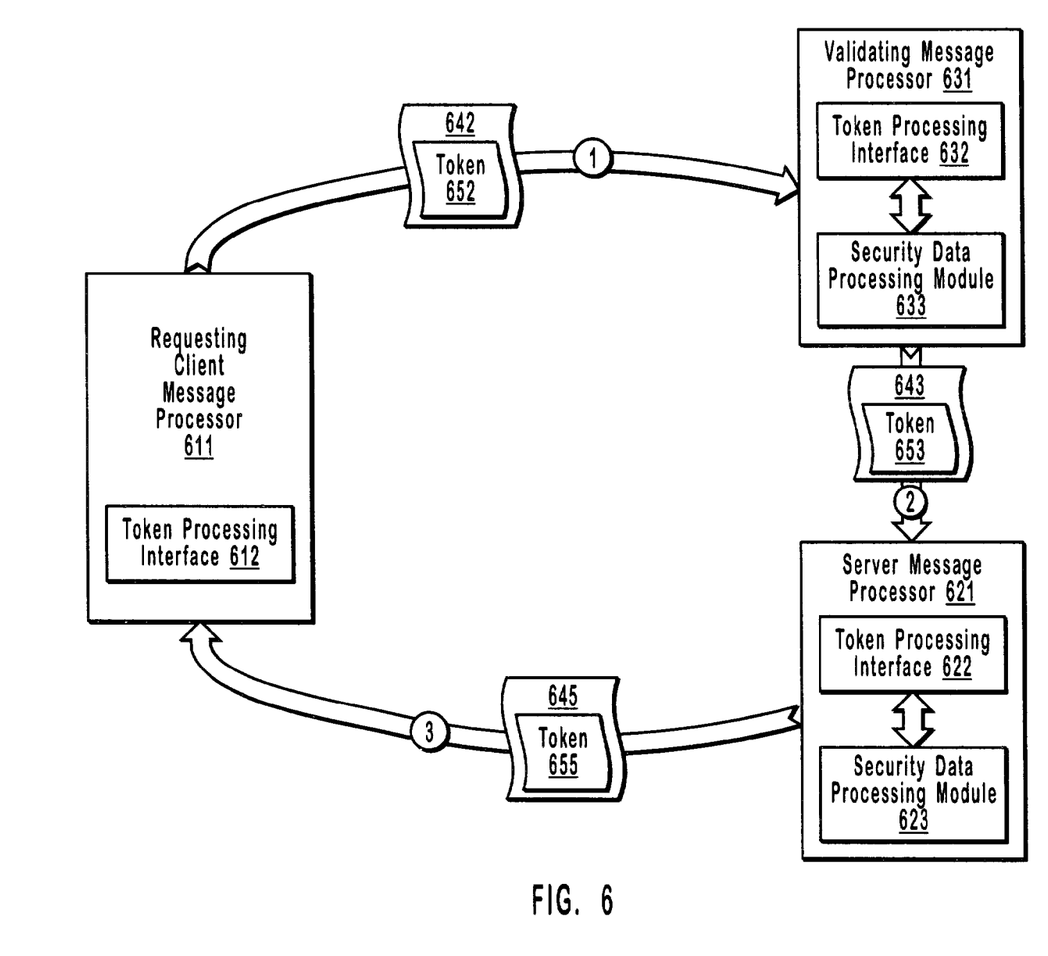
FIG. 6 illustrates a third example of a network architecture that can facilitate uniformly representing and transferring security assertions and security responses.

In yet other embodiments, a requesting client message processor sends security input data to a validating message processor that is then validated and routed to a server message processor. FIG. 6 illustrates network architecture 600 that includes requesting client message processor 611, server message processor 621, and validating message processor 631. Token processing interface 612 can encapsulate identified client security input data within a client security token (e.g., client security token 652).

As illustrated by arrow 1 in FIG. 6, requesting client message processor 611 sends electronic message 642, which includes client security token 652 (and possibly other non-encapsulated security input data), to validating server message processor 631. Token processing interface 632 can receive client security token 652.

Token processing interface 632 can process client security token 652 to reveal encapsulated client security input data. Based on the client security input data, security data processing module 633 can select client security output data and can append selected client security output data to revealed client security input data. Security data processing module 633 can compare the client security input data to a credentials database, a certificate, or to a trust policy to determine if requesting client message processor 611 is a trusted client. Token processing interface 632 can encapsulate client security input data and/or client security output data within a response security token (e.g., response security token 653).

As illustrated by arrow 2 in FIG. 6, validating message processor 631 sends electronic message 643, which includes response security token 653 (and possibly other non-encapsulated client security input data and/or non-encapsulated client security output data), to server message processor 621. Token processing interface 622 can receive and process response security token 653. Token processing interfaces 612, 622, and 632 can be configured to similarly abstract specialized protocols such that the possibility of compatible communication between requesting client message processor 611, server message processor 621, and validating server message processor 631 is increased.

Response security token 653 can contain some or all of the client security input data encapsulated in client security token 652 as well as any client security output data selected at validating message processor 631. If appropriate, token processing interface 632 and/or security data processing module 633 can insert or remove client security input data from client security token 652 before sending electronic message 643.

As illustrated by arrow 2 in FIG. 6, server message processor 621 receives electronic message 643, which includes response security token 653 (and possibly also other non-encapsulated client security input data or client security output data), from validating message processor 631. Token processing interface 622 can process response security token 653 to reveal encapsulated security input data and/or security output data. The revealed security input data and revealed security output data can be combined with other non-encapsulated security input data and security output data to determine if requesting client message processor 611 is trusted. When validating message processor 631 has already validated the client security input data (as indicated by selected client security output data), server message processor 621 may trust requesting client message processor 611.

Server message processor 621 may send an indication to requesting client message processor 611 that server message processor 621 trusts (or does not trust) requesting client message processor 611. For example, server message processor 621 can send electronic message 645, which includes security token 655 and/or other non-encapsulated client security input data and/or non-encapsulated client security output data, to requesting client message processor 611.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed system including a requesting message processor that is communicatively coupled to a validating message processor so as to be able to communicate by transferring electronic messages via a common protocol, a method for determining if a client message processor is a trusted client such that a need to have multiple protocols stacks to transfer security assertions and security responses is reduced at least at the requesting message processor, the method comprising:

an act of identifying authentication data of a first format that is to be transferred to the validating message processor;

an act of maintaining a security token processing interface for receiving multiple differently formatted portions of authentication data that have been uniformly encapsulated for transfer using the common protocol and for receiving corresponding multiple differently formatted portions of authentication result data that have been uniformly encapsulated for transfer using the common protocol so as to eliminate the need to maintain separate protocol stack for each of the multiple differently formatted portions of authentication data and corresponding multiple differently formatted portions of authentication result data;

an act of uniformly encapsulating a portion of the authentication data within a client security token such that the client security token can be processed by a corresponding validating token processing interface at the validating message processor, the uniform encapsulation allowing the portion of authentication data to be sent via the common protocol, the common protocol being readable by the validating message processor, and thereby allowing the client message processor to release any protocol stacks reserved for processing a reply message indicating whether the client message processor is a trusted client;

an act of the requesting message processor sending the client security token to the validating message processor;

an act of the requesting message processor receiving a response security token from the validating message processor via the common protocol, the response security token uniformly encapsulating a portion of authentication result data of a second format which is different from the first format, wherein the second format is selected based on the portion of authentication data; and an act of processing the response security token to determine if the portion of authentication result data indicates that the client message processor is a trusted client.

2. The method as recited in claim 1, wherein the act of identifying client security input data of a first format that is to be transferred to the validating message processor comprises an act of identifying client security input data of a first format that is to be transferred along with client security input data of at least one other format that is different from the first format.

3. The method as recited in claim 1, wherein the act of identifying client security input data of a first format that is to be transferred to the validating message processor comprises an act of identifying a request that includes one or more security assertions.

4. The method as recited in claim 1, wherein the act of identifying client security input data of a first format that is to be transferred to the validating message processor comprises an act of identifying a service access token.

5. The method as recited in claim 1, wherein the act of identifying client security input data of a first format that is to be transferred to the validating message processor comprises an act of the client identifying the client security input data.

6. The method as recited in claim 1, wherein the act of identifying client security input data of a first format that is to be transferred to the validating message processor comprises an act of a server that is attempting to determine if the client is a trusted client identifying the client security input data.

7. The method as recited in claim 1, wherein the act of encapsulating at least a portion of the client security input data within a client security token comprises an act of encapsulating one or more security assertions within a client security token.

8. The method as recited in claim 1, wherein the act of encapsulating at least a portion of the client security input data within a client security token comprises an act of encapsulating a request that includes one or more security assertions within a client security token.

9. The method as recited in claim 1, wherein the act of encapsulating at least a portion of the client security input data within a client security token comprises an act of encapsulating a service access token within a client security token.

10. The method as recited in claim 1, wherein the act of the requesting message processor sending the client security token comprises an act of a requesting message processor sending a SOAP envelope.

11. The method as recited in claim 1, wherein the act of the requesting message processor receiving a response security token comprises an act of the requesting token interface receiving a service access token.

12. The method as recited in claim 1, wherein the act of the requesting message processor receiving a response security token comprises an act of the requesting token interface receiving an answer to a request that one or more security assertions be validated.

13. The method as recited in claim 1, wherein the act of the requesting message processor receiving a response security token comprises an act of a server message processor receiving a trust statement that causes a trust policy to be updated.

14. The method as recited in claim 1, wherein the act of processing the response security token to determine if the at least a first portion of client security output data indicates that the client message processor is a trusted client comprises an act of processing the response security token to determine that a client is a trusted client.

15. The method as recited in claim 1, wherein the act of processing the response security token to determine if the at least a first portion of client security output data indicates that the client message processor is a trusted client comprises an act of processing trust statements included in the response security token to update a trust policy.

16. The method as recited in claim 1, wherein the act of processing the response security token to determine if the first portion of client security output data indicates that the client message processor is a trusted client comprises an act of determining that the first portion of security output data establishes a specified level of trust.

17. The method as recited in claim 1, wherein the first format and the second format are the same format.

18. The method as recited in claim 1, further comprising:
an act of appending additional client security input data to the identified security input data.

19. The method as recited in claim 1, further comprising:
an act of receiving a second portion of non-encapsulated client security output data of a third format.

20. In a distributed system including a requesting message processor that is communicatively coupled to a validating message processor so as to be able to communicate by transferring electronic messages via a common protocol, a method for determining if a client message processor is a trusted client such that a need to have multiple protocols stacks to transfer security assertions and security responses is reduced at least at the requesting message processor, the method comprising:

an act of identifying authentication data of a first format that is to be transferred to the validating message processor;

an act of maintaining a security token processing interface for receiving multiple differently formatted portions of authentication data that have been uniformly encapsulated for transfer using the common protocol and for receiving corresponding multiple differently formatted portions of authentication result data that have been uniformly encapsulated for transfer using the common protocol so as to eliminate the need to maintain separate protocol stack for each of the multiple differently formatted portions of authentication data and corresponding multiple differently formatted portions of authentication result data;

an act of uniformly encapsulating a portion of the authentication data within a client security token such that the client security token can be processed by a corresponding validating token processing interface at the validating message processor, the uniform encapsulation allowing the portion of authentication data to be sent via the common protocol, the common protocol being readable by the validating message processor, and thereby allowing the client message processor to release any protocol stacks reserved for processing a reply message indicating whether the client message processor is a trusted client;

an act of exchanging uniformly encapsulated security tokens, including the client security token and a response security token, via an abstract interface, with the validating message processor, the response security token uniformly encapsulating a portion of authentication result data of a second format which is different from the first format, wherein the second format is selected based on portion of authentication data; and an act of processing the response security token to determine if the portion of authentication result data indicates that the client message processor is a trusted client.

21. A computer program product for use in a distributed system including a requesting message processor that is communicatively coupled to a validating message processor so as to be able to communicate by transferring electronic messages via a common protocol, the computer program product for implementing a method for determining if a client message processor is a trusted client such that a need to have multiple protocols stacks to transfer security assertions and security responses is reduced at least at the requesting message processor, the computer program product comprising one or more physical storage media having stored thereon computer-executable instructions that, when executed by a processor, cause the distributed system to perform the method, including the following:

identify authentication data of a first format that is to be transferred to the validating message processor;

maintain a security token processing interface for receiving multiple differently formatted portions of authentication data that have been uniformly encapsulated for transfer using the common protocol and for receiving corresponding multiple differently formatted portions of authentication result data that have been uniformly encapsulated for transfer using the common protocol so as to eliminate the need to maintain separate protocol stack for each of the multiple differently formatted portions of authentication data and corresponding multiple differently formatted portions of authentication result data;

uniformly encapsulate a portion of the authentication data within a client security token such that the client security token can be processed by a corresponding validating token processing interface at the validating message processor, the uniform encapsulation allowing the portion of authentication data to be sent via the common protocol, the common protocol being readable by the validating message processor, and thereby allowing the client message processor to release any protocol stacks reserved for processing a reply message indicating whether the client message processor is a trusted client;

send the client security token to the validating message processor by the requesting message processor;

receive a response security token from the validating message processor by the requesting message processor via the common protocol, the response security token uniformly encapsulating a portion of authentication result data of a second format which is different from the first format, wherein the second format is selected based on the portion of authentication data; and process the response security token to determine if the portion of authentication result data indicates that the client message processor is a trusted client.

* * * * *